Oct. 31, 1961   J. J. WEIMAN   3,006,496
COLLAPSIBLE CONTAINER
Filed Sept. 16, 1957
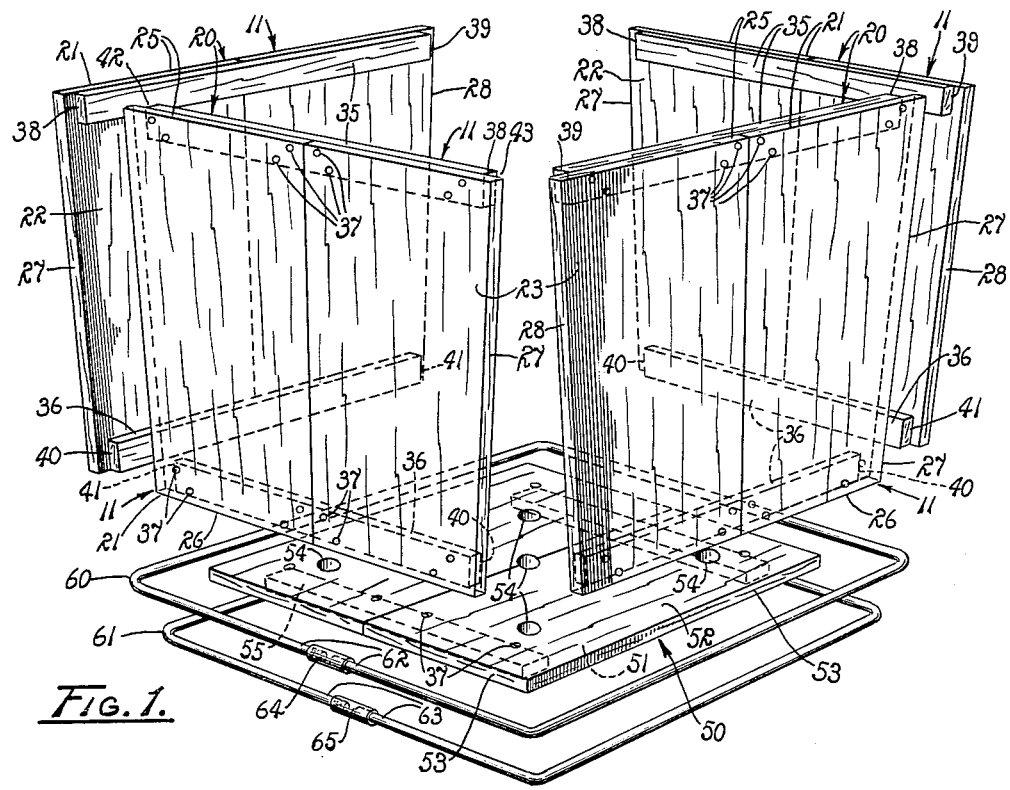
FIG. 1.
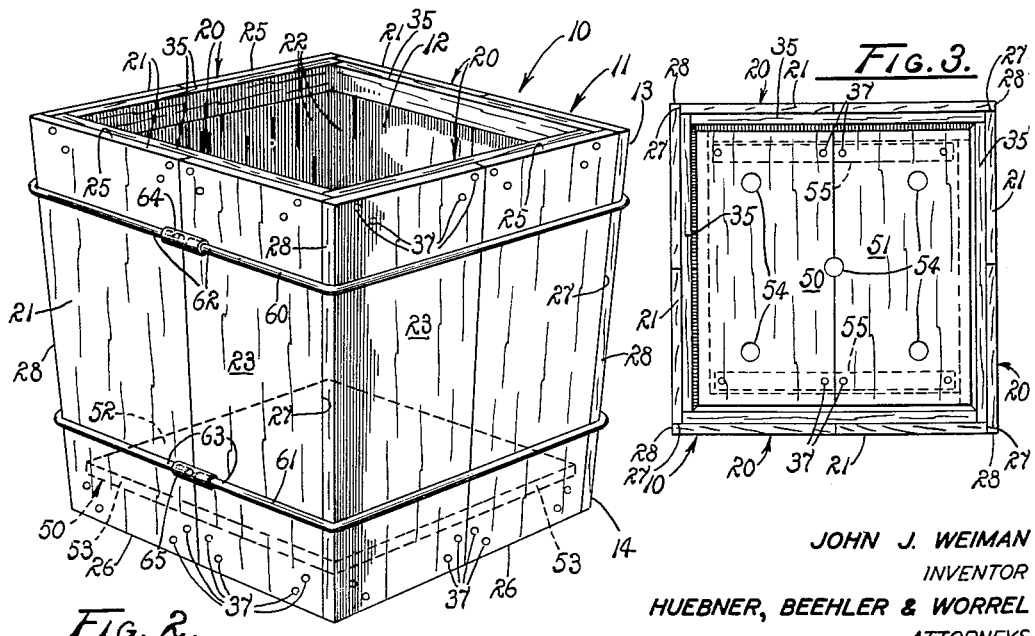
FIG. 2.
FIG. 3.
JOHN J. WEIMAN
INVENTOR
HUEBNER, BEEHLER & WORREL
ATTORNEYS
BY

United States Patent Office 3,006,496
Patented Oct. 31, 1961

3,006,496
COLLAPSIBLE CONTAINER
John J. Weiman, Rte. 1, Box 214, Visalia, Calif., assignor of one-half to Andrew J. Caglia, Fresno, Calif.
Filed Sept. 16, 1957, Ser. No. 684,016
1 Claim. (Cl. 217—12)

The present invention relates to a collapsible container and more particularly to a container constructed of a plurality of interfitted sections which are adapted for connection and disconnection without the use of any container embedded fastening members.

It is well-known that plants, such as trees and shrubs are grown by nurseries in dirt filled cans, pots, barrels, and the like, prior to sale and planting. When the plants are in cans, they are usually removed by longitudinally cutting the cans and by pulling the resultant sides apart to expose the ball of dirt around the plant roots. This task must be performed carefully inasmuch as it is important not to break open the ball of earth and to expose the roots therein. This method of storing and planting trees and shrubs requires that the cans be destroyed in order to remove the plants with the ball of dirt intact. Another disadvantage is that it is difficult to store and to transport such cans. Pottery containers are subject to the same disadvantages.

Accordingly, it is an object of the present invention to provide an improved collapsible container.

Another object is to enable the planting, growing, storage and sale of potted plants in an economical manner.

Another object is to simplify the removal of a potted plant having a root system growing in a ball of dirt from a container in which the ball of dirt and roots are compacted.

Another object is to provide a container which is adapted for compact shipment and storage when not in use.

Another object is to provide a container including a plurality of interfitted sections which are of substantially the same size and shape to facilitate and standardize their construction and use.

Another object is to provide a container for potted plants which can be easily removed from their respective plants and reassembled for repeated subsequent use.

Other objects are to provide a collapsible container which is simple to construct and use, dependable in operation, durable in form, adapted for a variety of uses, and which is highly effective for accomplishing its intended purposes.

These, together with other objects, will become more fully apparent upon reference to the following description.

In the drawing:

FIG. 1 is an exploded perspective view of a collapsible container embodying the principles of the present invention.

FIG. 2 is a perspective view of the collapsible container in assembled condition.

FIG. 3 is a top plan view of the assembled container.

Referring more particularly to the drawing, a container embodying the principles of the present invention is generally indicated by the numeral 10. The container has a circumscribing side wall 11 in the form of a frustum of a pyramid, as illustrated in FIG. 2, which encompasses an interior 12 of the container. The side wall has an upper end 13 of predetermined maximum rectangular cross-sectional area and a lower end 14 of predetermined minimum rectangular cross-sectional area. It is also to be noted that the opposite ends of the side wall are of uniform shape and are of maximum and minimum circumference.

The side wall 11 includes a plurality of interfitted sections 20 of uniform size, congruent shape and similar construction each of which includes a trapezoidal panel 21 having an inner surface 22 and an outer surface 23. Each panel is shown as being formed of two segments integrally interconnected but this is merely for constructional convenience. It will be evident that each panel could just as well be made from a single integral sheet of material or any desired multiple. As shown, the panels are made of wood and preferably of redwood for the specific purposes involved. However the container can be made of plastic, metal, or other suitable material, as desired. Each panel has an upper edge 25, a lower edge 26 parallel to the upper edge, and opposite side edges 27 and 28 interconnecting the upper and lower edges and convergently downwardly extended from the upper edge to the lower edge.

Each section 20 of the side wall 11 also provides elongated upper and lower cleats 35 and 36, preferably also of wood, which are secured, as by nails 37, to the inner surface 22 of a panel 21 along its upper and lower edges 25 and 26. However, as best seen in FIG. 1, the cleats have opposite ends 38, 39, 40, and 41 which are in endwardly spaced relation to the adjacent side edges 27 and 28 of their respective panels. This spacing defines a side wall receiving notch 42 along a first side edge 28 of each panel and a cleat receiving notch 43 along the opposite side edge 27 of each panel. Obviously, the lower cleats are shorter in length than the upper cleats and in this manner provide notches of equal length measured longitudinally of the cleats. The thickness of the cleats is substantially equal to the thickness of the panels and to the length of the notches. If preferred, the upper cleats 35 can be secured to the outer surfaces 23 of their respective panels in endwardly spaced relation to the adjacent side edges, as before; the upper cleats thereby provide the additional advantage of means for lifting the box.

The container 10 also provides a substantially rectangular bottom wall 50 having a bottom surface 51, a top surface 52, side edges 53, and a plurality of apertures 54 providing air passageways and drainage openings. A pair of bottom cleats 55 are secured by the nails 37 to the bottom surface 51 of the bottom wall. As with the side wall sections 20, the bottom wall can be one integral piece of material, and the bottom cleats can be omitted.

As best seen in FIGS. 2 and 3, the sections 20 of the container are interfitted in the described frustum-pyramidal form with the side wall receiving notches 42 of each section 20 receiving the side edge 28 of an adjacent side wall section and with the cleat receiving notches 43 of each panel receiving the end of the cleats of an adjacent section. Further, the bottom wall 50 is fitted downwardly through the interfitted side wall sections and is rested on the lower cleats 36 with the side edges 53 in engagement with the inner surfaces 22 of the side wall panels 21. It is thus to be noted that the area of the bottom wall is less than the maximum transverse cross-sectional area of the interior 12 but greater than the minimum transverse cross-sectional area of such interior so that the edges of the bottom wall are in relatively tight frictional engagement with the side walls and can be wedged tightly downwardly therein.

Upper and lower substantially rectangular bands 60 and 61 of wire or the like are provided. The bands circumscribe different peripheral portions of the circumscribing side walls 11. The bands conveniently are formed from a length of band material and are cut and formed to provide adjacent spaced ends 62 and 63 respectively. Clamps 64 and 65 are provided for releasably interconnecting the adjacent ends of the bands. These clamps may take one of many forms. As shown, one of the ends of each band is threaded, and the clamps are internally threaded onto the threaded ends of the bands. The opposite ends of the clamps are not threaded but are rotatably but non-removably received on the unthreaded ends of the bands. Actually the clamps may take any suitable form for the purpose, as for example, that of sleeves slidably fitted over the adjacent ends of the bands and crimped into place. When the side wall sections 20 are interfitted, as described, the larger upper band is first moved over the lower end 15 of the side wall in circumscribing relation thereto and into releasable friction tight engagement with the outer surface 23 of the panels 21 and adjacent to the upper end 12. The smaller lower band is similarly fitted over the side wall but is limited in its movement longitudinally of the side walls to a position in friction tight engagement with the outer surfaces of the panels adjacent to the lower end of the side wall. Preferably the side wall is inverted so that its large end rests on a supporting surface, not shown, when applying the encircling bands. The bands are tightened around the side wall by tapping on them with a hammer, not shown, in the direction of the upper end. This is most easily done in the described inverted position of the container 10. If preferred, the bands can provide releasably interconnected hooks instead of the threaded couplings. Also, the split in the bands can be located at the corners of the box instead of in the middle of a panel, as shown.

*Operation*

The operation of the described embodiment of the subject invention is believed to be readily apparent and is briefly summarized at this point.

With the container 10 assembled in the condition illustrated in FIG. 2, the roots of a plant, not shown, are embedded in earth packed into the interior 12 of the container so that the plant extends upwardly therefrom. The bands 60 and 61 hold the side wall intact and enable transporting and storing of the container holding the plant, as desired.

For planting the plant the container 10 is preferably positioned adjacent to a planting hole. The bands 60 and 61 are then slipped downwardly from the side wall 11 preferably by tapping thereon. As soon as the bands fall to the ground, the sections 20 fall outwardly and away from the clump of dirt within the side wall 11. Because the dirt is usually moist, it holds together and can then be picked up gently and lowered into the planting hole.

Alternatively, it may be desired to dig a hole large enough for the container 10 to fit into whereupon the bands and side wall sections are removed as before. However in this case, the bottom wall 50 is left in the planting hole below the clump of dirt and the side wall sections 20 and the bands 60 and 61 are removed. For this purpose the bands are preferably split so that after the clamps 64 and 65 are removed, the plant can be easily passed between the adjacent edges 62 and 63 of the bands when pulled apart. In this manner it is unnecessary even to handle the clump of dirt previously contained within the side wall 11. This insures retention of the plant roots in the nourishing soil at all times prior to planting.

After removal of a plant, the sections 20 and the bottom wall 50 may then be stacked one upon the other and circumscribed by the bands 60 and 61 for convenient transport and storage. Obviously, any number of sections, bottom walls, and bands can be handled in this manner in a very compact association. The containers are adapted for repeated use merely by re-assembling the parts in the manner previously described.

From the foregoing it will be evident that a highly advantageous collapsible container has been provided which is especially adapted for use in holding potted plants prior to planting, is readily adapted for compact storage and transport, and is re-usable. This is in contrast to prior art pots and metallic cans which frequently cause the ball of dirt around the roots to break during plant removal, which are not suited for compact storage or transport, and which are usually destroyed in removing the plants.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent devices and apparatus.

Having described my invention, what I claim as new and desire to secure by Letters Patent is:

A plant container adapted to be disassembled and separated from the plant while the plant is located in a planting hole in the ground or in other restricted area comprising a frusto-pyramidal side wall circumscribing an interior for the container adapted to receive a growing medium and a plant embedded therein, the side wall having an upper end portion of maximum circumference, a lower end portion of minimum circumference, and an intermediate portion between the upper and lower portions of a circumference less than the maximum circumference but greater than the minimum circumference, said upper end portion circumscribing an upper opening through which such a plant extends from the interior of the container, the side wall circumscribing an axis for the container and having a substantially rectangular cross-section normal to said axis, the side wall including a plurality of separably interfitted wall sections, each of the wall sections including a trapezoidal side panel having inner and outer surfaces, upper and lower edges of maximum and minimum length respectively, and opposite side edges, with adjacent side edges of adjacent sections being in contact and forming angulated corners of the side wall, each wall section including a pair of elongated upper and lower cleats of substantially rectangular cross-section individually secured transversely to the inner surface of their respective side panel adjacent to such panel's upper and lower edges, each cleat having opposite end edges in adjacent spaced relation to the side edges of such side panel thereby forming notches endwardly of the opposite end edges of each cleat whereby with the adjacent side edges of adjacent sections in contact, the notches along one side edge of each side panel receive the upper and lower cleats of the adjacent wall section in fitted relationship therein and whereby the notches along the opposite side edge of each panel receive the panel of the wall section adjacent to said opposite side edge in fitted relationship therein; a rectangular bottom wall fitted within the side wall sections and rested on the lower cleats in opposed relation to said upper opening; and upper and lower, releasably enclosed bands of substantially cylindrical cross-section, each band having a substantially fixed circumference when enclosed, of rigid, rectangular shape corresponding to the periphery of the side wall, the circumference of the upper band being less than said maximum circumference but greater than said intermediate circumference, the circumference of the lower band being greater than said minimum circumference but less than said intermediate circumference, the upper and lower bands being in circumscribing relation to the wall with the upper band being in engagement with the outer surfaces of the panels above the intermediate portion and with the lower band being in tangential engagement with the outer surfaces of the panels below said intermediate portion, the bands being slidable on the wall toward said end portion of maximum circumference and into increased friction-tight constriction about the wall, the interfitted side edges of the panels precluding movement of any of the panels inwardly of the container out of said rectangular pyramidal forming relation when so constricted by the bands, the bands also being slidable on the wall toward said end portion of minimum circumference for separation from the wall sections, and the bands having releasably interconnected end portions to facilitate removal thereof from around a plant in the container and subsequent to separation of the wall sections from the plant and such growing medium.

References Cited in the file of this patent

UNITED STATES PATENTS

| | | |
|---|---|---|
| 94,202 | Gustafson | Aug. 31, 1869 |
| 193,714 | Klein | July 31, 1877 |
| 891,609 | Dulaney | June 23, 1908 |
| 944,146 | Newville | Dec. 21, 1909 |
| 1,471,113 | Ewell | Oct. 16, 1923 |
| 1,495,937 | Wakeman | May 27, 1924 |
| 1,900,646 | Hile | Mar. 7, 1933 |
| 2,042,323 | Ott | May 26, 1936 |
| 2,792,142 | Sandkuhle | May 14, 1957 |
| 2,890,809 | Poley | June 16, 1959 |

FOREIGN PATENTS

| | | |
|---|---|---|
| 1,086,676 | France | Aug. 11, 1954 |